(12) United States Patent
Eccles et al.

(10) Patent No.: US 6,331,099 B1
(45) Date of Patent: Dec. 18, 2001

(54) FLEXIBLE HOSES COMMUNICATING WITH A DEPLOYABLE HYDRAULIC POWER ASSEMBLY

(75) Inventors: Steven Robert Eccles, Torrance; Wayne Godoy Schindler, Huntington Beach, both of CA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/457,506

(22) Filed: Dec. 8, 1999

(51) Int. Cl.[7] .................................................... F01D 5/00
(52) U.S. Cl. ........................................ 416/142; 416/244 A
(58) Field of Search .................................. 415/130, 129, 415/213.1; 416/131, 132 R, 142, 149, 204 A, 244 A; 244/58, 102 R, 102 XL, 49

(56) References Cited

U.S. PATENT DOCUMENTS

| | | |
|---|---|---|
| 2,475,723 * | 7/1949 | Sanford ........................... 244/102 SL |
| 4,742,976 * | 5/1988 | Cohen ..................................... 244/58 |
| 5,174,719 | 12/1992 | Walsh et al. . |
| 5,398,780 * | 3/1995 | Althof et al. ............................ 185/39 |
| 5,484,120 | 1/1996 | Blakeley et al. . |
| 5,562,417 | 10/1996 | Grimm et al. . |
| 5,564,903 | 10/1996 | Eccles et al. . |
| 5,685,694 | 11/1997 | Jones et al. . |
| 5,779,446 | 7/1998 | Althof et al. . |

* cited by examiner

Primary Examiner—Edward K. Look
Assistant Examiner—Ninh Nguyen
(74) Attorney, Agent, or Firm—William J. Zak, Jr. Esq.

(57) ABSTRACT

A hydraulic power assembly is comprised of a hydraulic pump being attached to and powered by a ram air turbine. A strut is rotatably attached to an aircraft by having one end mounted on a trunion, and the hydraulic power assembly affixed to the other, distal end. Flexible hoses fluidly communicate the pump with a hydraulic interface located inside of the aircraft. The hydraulic interface fluidly communicates with the aircraft's hydraulic system. The hydraulic power assembly and the strut are normally stored within the fuselage of the aircraft and are deployable into an adjacent airstream in an emergency.

19 Claims, 5 Drawing Sheets

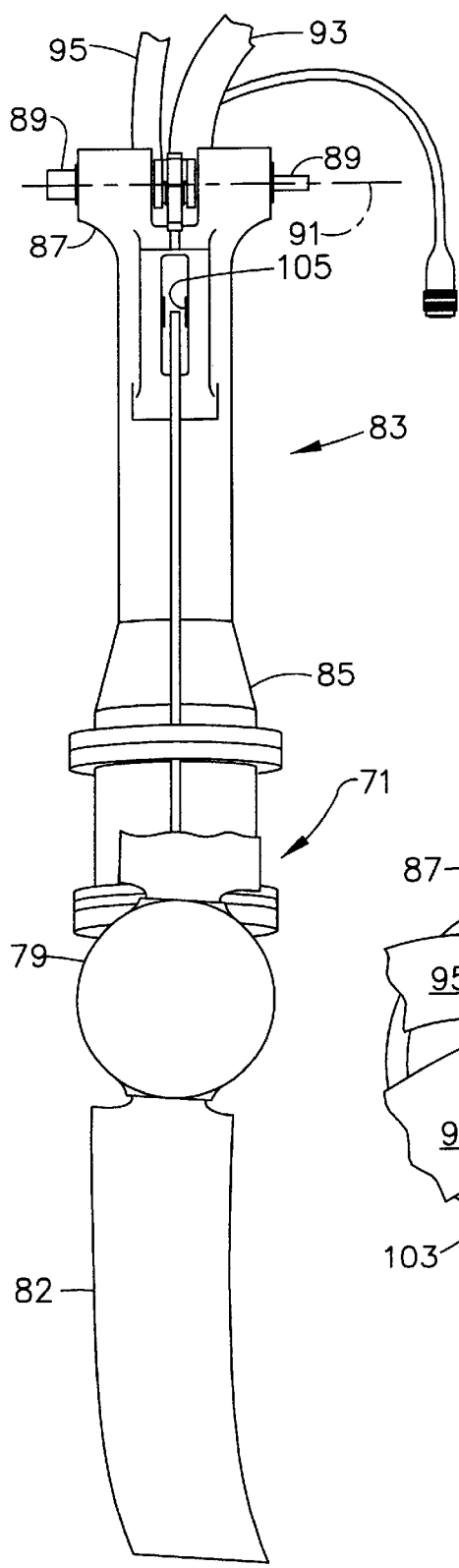
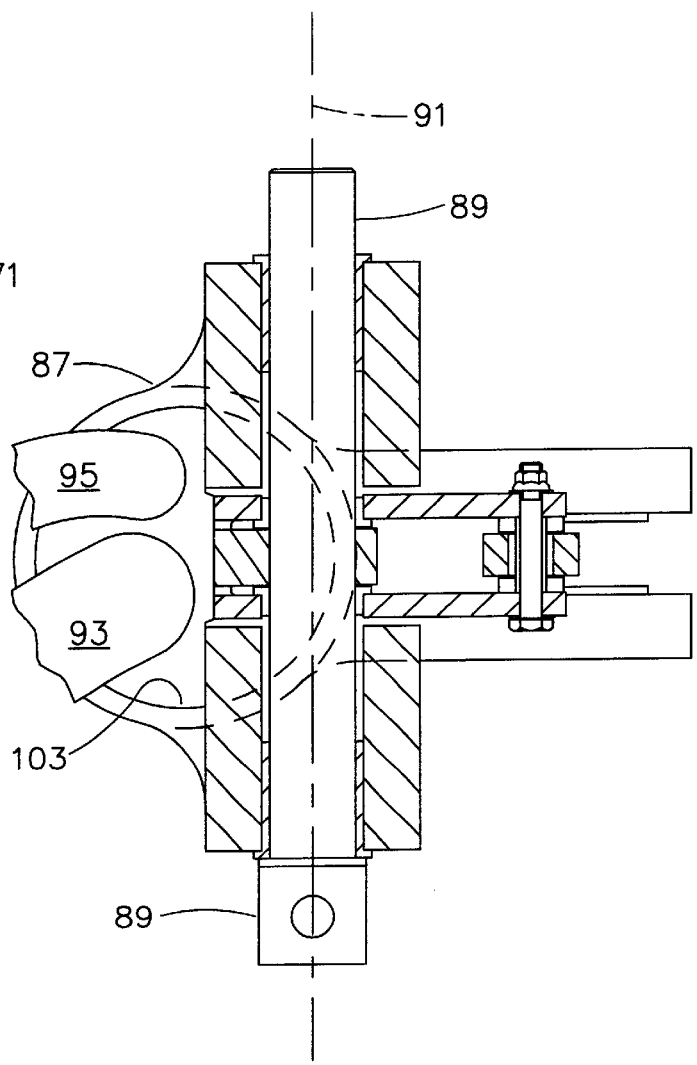
FIG. 5
FIG. 6

FLEXIBLE HOSES COMMUNICATING WITH A DEPLOYABLE HYDRAULIC POWER ASSEMBLY

BACKGROUND OF THE INVENTION

The present invention relates generally to hydraulic apparatus and, more particularly, to flexible hoses for communicating hydraulic fluid between a deployable ram air turbine powered hydraulic pump, and the hydraulic system of an aircraft.

The hydraulic return fluid, also known as the pressure fluid, for an aircraft is furnished by a hydraulic pump powered by a propulsive engine or by a turbine having rotatable blades located in and turned by the airstream adjacent the fuselage when the aircraft is airborne. As an aircraft typically has redundant backup systems, it may use both of the foregoing power sources to power, respectively, several hydraulic pumps. The latter power source is commonly referred to as a ram air turbine. A hydraulic pump is commonly attached to the ram air turbine, and directly powered by the turbine's drive shaft. The ram air turbine and attached pump together form a hydraulic power assembly.

Such a hydraulic power assembly is used in two ways. Firstly, it is rigidly mounted external to the fuselage so that the ram air turbine is always exposed to the airstream and thus operates whenever the aircraft is airborne. Alternatively, the assembly is stored in an up position out of the airstream of the airborne aircraft or is housed within the fuselage and rotatably deployed into the airstream of an airborne aircraft only when called on in an emergency.

The rigidly mounted, permanently deployed hydraulic power assembly is commonly called an auxiliary power unit, and is used to generate continual hydraulic return fluid whenever the aircraft is airborne. The deployable hydraulic power assembly is rotated into the airstream only in an emergency, for example, the failure of an engine or a hydraulic pump powered by a main engine, or running out of fuel.

Storing the hydraulic power assembly in an up position or housing it within the fuselage and deploying it only when necessary offers several advantages over using a permanently deployed auxiliary power unit as an emergency backup for hydraulic return fluid. Firstly, the deployable configuration reduces the coefficient of drag for the aircraft because the ram air turbine is seldom going to be exposed to the airstream. Secondly, since the rotatable blade and connected turbine will be rotating only during an emergency, the aforementioned components need not be engineered to the same demanding specifications as an auxiliary power unit generating the same hydraulic return fluid. This results in a savings in cost and weight, as well as an improvement in reliability.

The hydraulic power assembly is typically attached to one end of a strut, with the other end of the strut being mounted on a trunion attached to the airframe. The hydraulic power assembly is deployed by activating an actuator which rotates it around the trunion. The challenge posed by the foregoing configuration lies in communicating the hydraulic fluid between the hydraulic pump of the hydraulic power assembly and the hydraulic system of the aircraft, given the necessary rotation of the hydraulic power assembly relative to the airframe. A conventional approach to this problem is shown in FIGS. 1, 2 and 3.

More particularly, FIG. 1 is a side view of ram air turbine 21 in its deployed position. Ram air turbine includes blades 23. Hydraulic pump 25 is attached to and powered by ram air turbine 21. Hydraulic power assembly 26 is comprised of ram air turbine 21 and hydraulic pump 25.

Strut 27 includes distal end 29 and proximal end 31. Hydraulic power assembly 26 is attached to distal end 29. The foregoing are integral components of aircraft 33, which also includes airframe 35, fuselage skin 37 and trunion 39. The position of hydraulic power assembly 26 in its stowed position within fuselage skin 37 is shown in phantom.

FIG. 2 is a front view of proximal end 31 of strut 27 and illustrates its connection to airframe 35 in greater detail. Proximal end 31 is attached to hydraulic swivel 41 and is also mounted on trunion 39 by means of coaxial annular openings 42 and 43, allowing strut 27 and hydraulic power assembly 26 to rotate about axis of rotation 44.

Referring again to FIG. 1, hydraulic power assembly 26 is deployed by means of actuator 45. Actuator 45 is fixedly attached to airframe 35 and rotatably attached to proximal end 31 of strut 27 at pivot 47. Return tube 49 and supply tube 51 fluidly communicate hydraulic fluid between hydraulic swivel 41 and hydraulic interface 53. Tubes 49 and 51 are rigid metal tubes. The hydraulic system for aircraft 33 fluidly communicates with hydraulic interface 53.

FIG. 3 is a frontal section view of hydraulic swivel 41. Hydraulic swivel 41 includes fitting 55, journal housing 57, and annular seals 59. Fitting 55 is located over and around journal housing 57, and in slidable abutment thereto. Journal housing 57 includes attachment flange 61. Proximal end 31 of strut 27 is attached to hydraulic swivel 41 and journal housing 57 at attachment flange 61. Thus, hydraulic power assembly 26, strut 27 and journal housing 57 are free to rotate about axis of rotation 44, relative to fitting 55 and airframe 35.

Journal housing 57 contains return passageway 63 and supply passageway 65. Fitting 55 contains return passageway 66 and supply passageway 67. Return conduit 68 in strut 27 fluidly communicates with pump 25. Return passageway 63 fluidly communicates return passageway 66 with conduit 68. Return passageway 66 is sealably connected with return tube 49. Thus, the return hydraulic fluid from pump 25 fluidly communicates with hydraulic interface 53.

Supply conduit 69 in strut 27 fluidly communicates with pump 25. Supply passageway 65 fluidly communicates supply passageway 67 with supply conduit 69. Supply passageway 67 is sealably connected to supply tube 51. Thus, the supply hydraulic fluid from hydraulic interface 53 fluidly communicates with pump 25.

As may be discerned from the foregoing description, seals 59 are necessarily composed of a flexible material, yet are subjected to pressure, corrosive hydraulic fluid, and friction from the rotation of journal housing 57 relative fitting 55. Thus, as is typical for devices having fluid seals, the reliability and life of hydraulic swivel 41 is primarily limited by the reliability and life of seals 59.

Furthermore, should seals 59 stick or otherwise fail to allow the free rotation of journal housing 57 relative to fitting 55, fitting 55 would be subjected to torque about axis of rotation 44. Since fitting 55 is coupled to return tube 49 and supply tube 51, the application of such torque would create a lateral force against fitting 55 and, more particularly, against the respective connections between return tube 49 and return passageway 66, and supply tube 51 and supply passageway 67. As neither fitting 55 nor the respective connections are designed to resist lateral force, such loading could cause the leakage of hydraulic fluid from hydraulic swivel 41.

In addition to concerns over leakage, the sticking of seals 59 could cause crimping in tubes 49 and 51, which would restrict the flow of hydraulic fluid therethrough. With respect to supply tube 51, crimping could result in the supply flow dropping low enough to cause cavitation in the supply flow to pump 25, resulting in vaporization of hydraulic fluid and, ultimately, the failure of pump 25 to maintain the return pressure above the required minimum operational level.

Given the requirements that hydraulic swivel 41 communicate hydraulic fluid without leaking and that journal housing 57 rotate relative to fitting 55, the components of hydraulic swivel 41 must be machined to very narrow tolerances. The manufacture of hydraulic swivel 41 is thus expensive. Furthermore, great care must be taken to colinearly align the axis of rotation of journal housing 57 relative to fitting 55, with axis of rotation 44 because misalignment would result in part of the considerable weight of hydraulic power assembly 26 and strut 27 being resisted by hydraulic swivel 41. The entirety of the foregoing weights is intended to be resisted solely by trunion 39. As hydraulic swivel 41 is not designed to resist such force, misalignment could result in movement, bending or fracture of one or more of its components, and ultimately occasion leakage.

U.S. Pat. No. 5,484,120 issued to Blakeley et al. also shows a deployable ram air turbine. More particularly, in column 3 at lines 11–15 and column 8 at lines 19–22, Blakeley et al. disclose using hydraulic lines to transfer power generated by a deployed ram air turbine through the strut to the aircraft.

Based on the foregoing, it can be appreciated that there is a need in the art for fluidly communicating hydraulic fluid between the pump on an articulated ram air turbine and the hydraulic interface of an aircraft, in a manner which overcomes the above-described disadvantages, shortcomings and limitations of the prior art. The present invention fulfills this need in the art.

SUMMARY OF THE INVENTION

Briefly, the present invention is comprised of flexible hoses fluidly communicating a hydraulic interface located inside of an aircraft with a hydraulic pump that is rotatable relative to the aircraft. A strut is rotatably attached to the aircraft by virtue of one end being mounted on a trunion. A hydraulic power assembly is comprised of the pump and a ram air turbine, with the pump being attached to and powered by the ram air turbine. The hydraulic power assembly is attached to the distal end of the strut.

An actuator is rotatably attached to the strut. The hydraulic power assembly is stored within the fuselage of the aircraft and is deployable in an emergency upon activation of the actuator. A hydraulic interface in the aircraft fluidily communicates with the aircraft's hydraulic system. Supply and return hoses fluidly communicate the supply and return ports of the hydraulic interface with the supply and return ports of the hydraulic pump, respectively.

The flexibility of the hoses enables the foregoing communication to be maintained throughout the range of rotation of the hydraulic power assembly about the trunion. The flexible hoses of the present invention thus replace hydraulic swivel 41 of the prior art, with a resultant reduction in weight. Moreover, there is a savings of the considerable expense of machining hydraulic swivel 41 to its requisite low tolerance. Furthermore, the use of seals 59, with their attendant drawbacks, is entirely avoided.

The use of the flexible hoses of the present invention decreases the time required to mount the strut on its trunion because it is no longer necessary to precisely colinearly align the axis of rotation of journal housing 57 relative to fitting 55, with axis of rotation 44 of strut 27 as is the case when hydraulic swivel 41 of the prior art is used. Additionally, the use of the flexible hoses of the present invention allows the flow of hydraulic fluid to and from the pump to avoid turning through the right angles of the passageways through hydraulic swivel 41. In eliminating the pressure drop caused by such turning of fluid flow, the present invention substantially reduces the possibility of cavitation in the supply flow to the pump, and increases the return pressure to the hydraulic interface.

BRIEF DESCRIPTION OF THE DRAWINGS

FIG. 5 is a front view of the flexible hoses of the preferred embodiment of the present invention used in conjunction with a strut and attached hydraulic power assembly; and FIG. 6 is a top section view taken along line 6—6 of FIG. 4, which shows the flexible hoses of the preferred embodiment of the present invention passing through an opening in the proximal end of the strut.

DETAILED DESCRIPTION OF THE INVENTION

Figure 1:
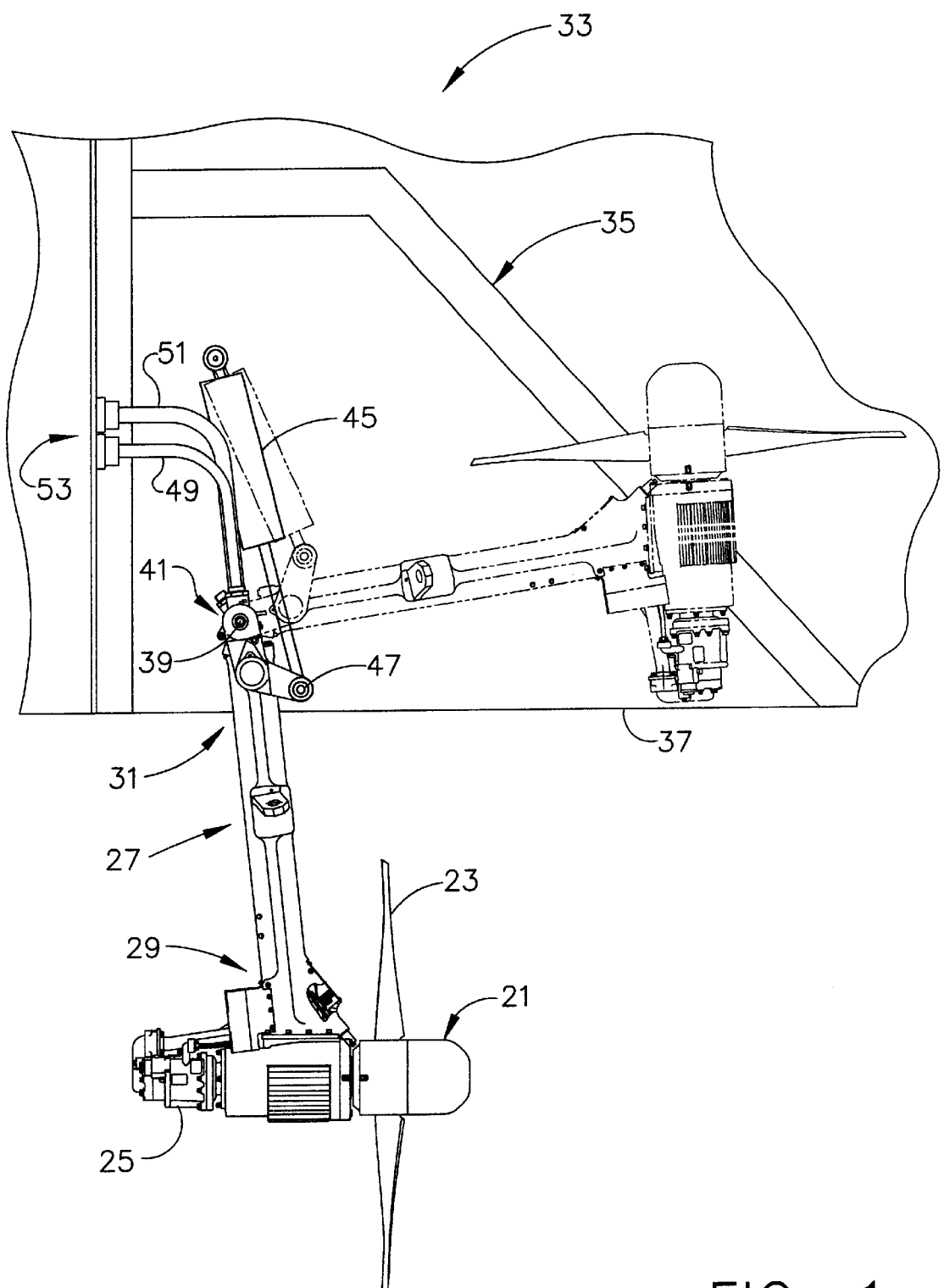
FIG. 1 is a side view of a swivel of the prior art used in conjunction with a strut and attached hydraulic power assembly, with the hydraulic power assembly situated in its deployed position.
Figure 2:
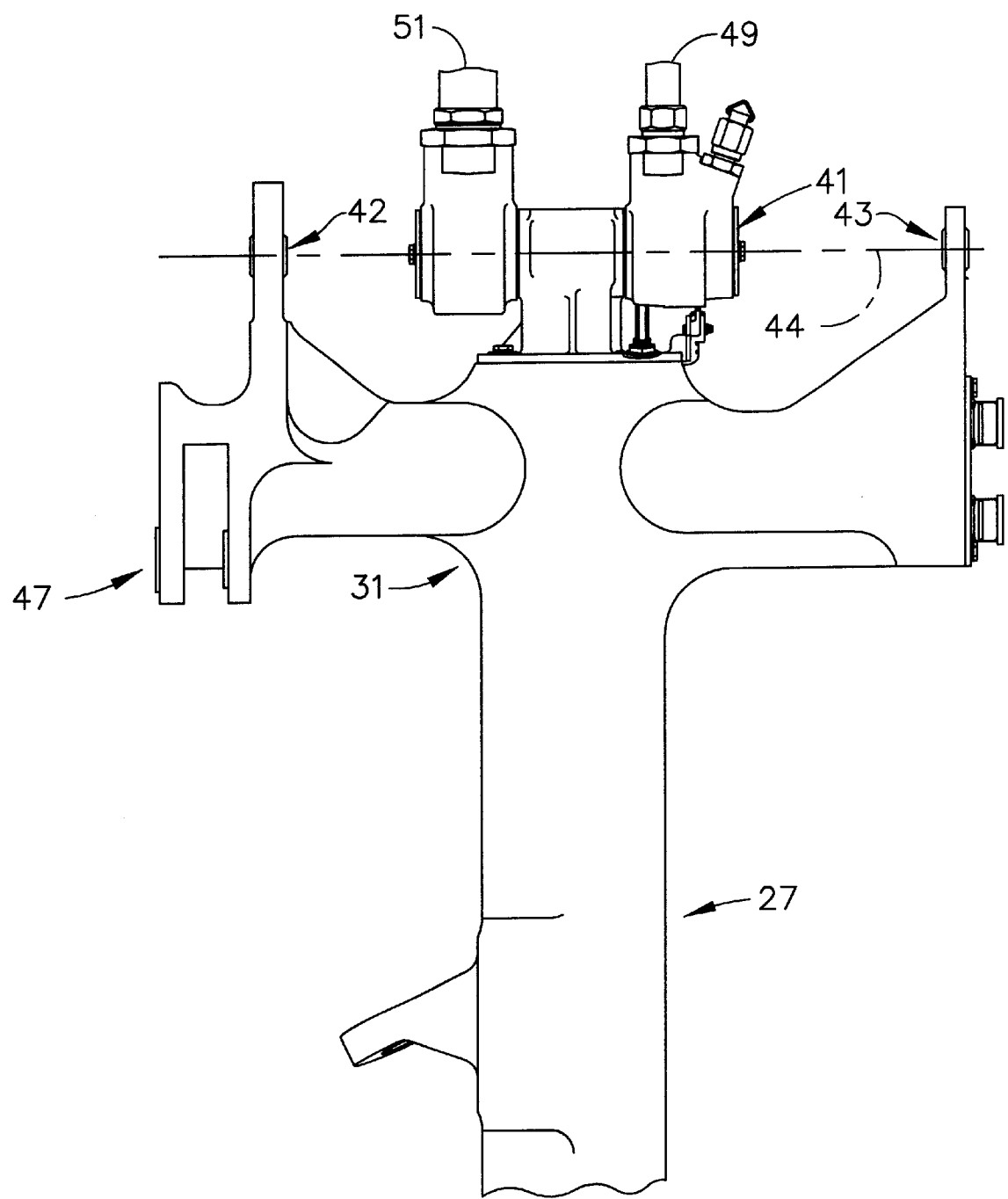
FIG. 2 is a front view of the swivel of the prior art and the attached proximal end of the strut.
Figure 3:
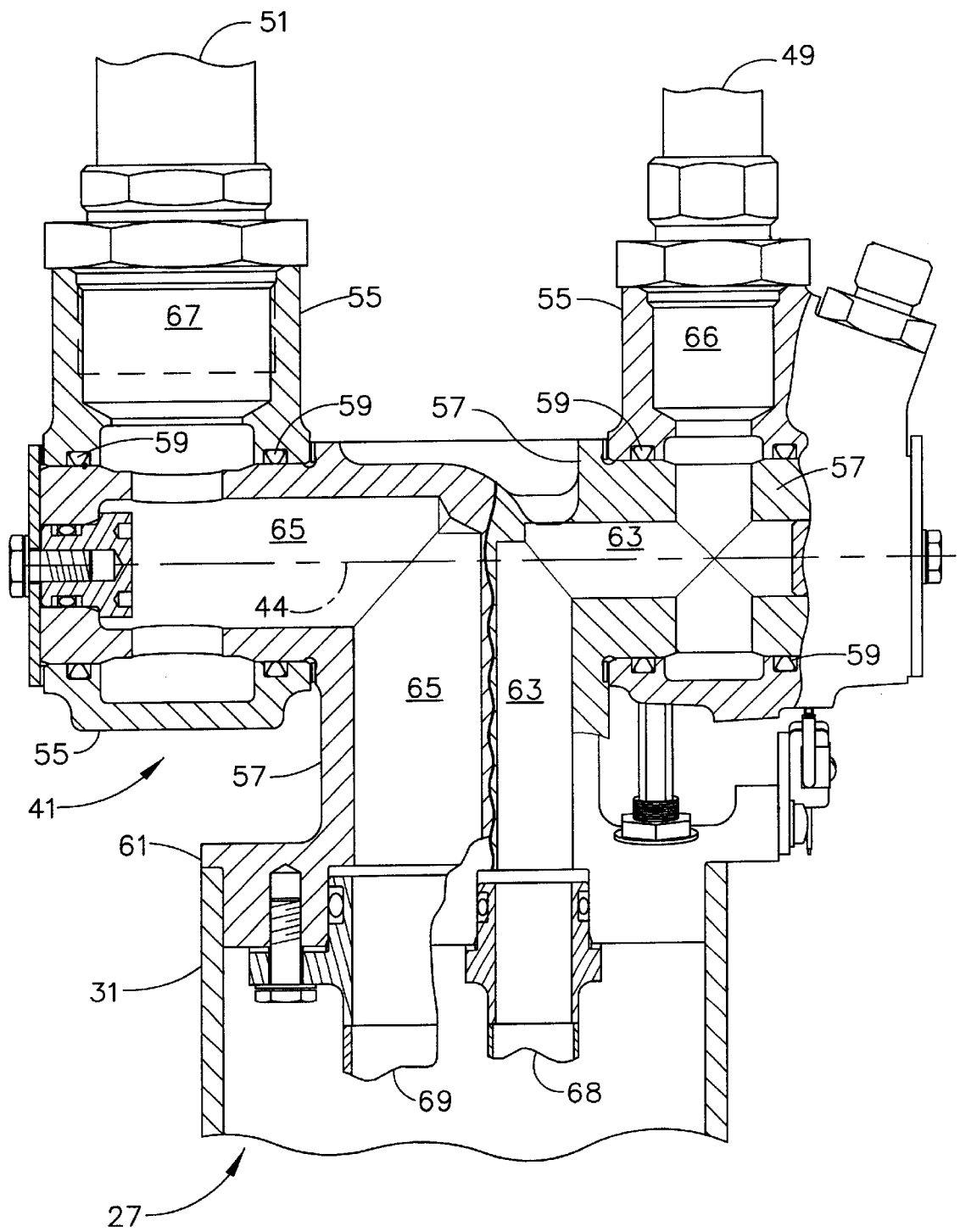
FIG. 3 is a frontal section view of the aforementioned swivel of the prior art.
Figure 4:
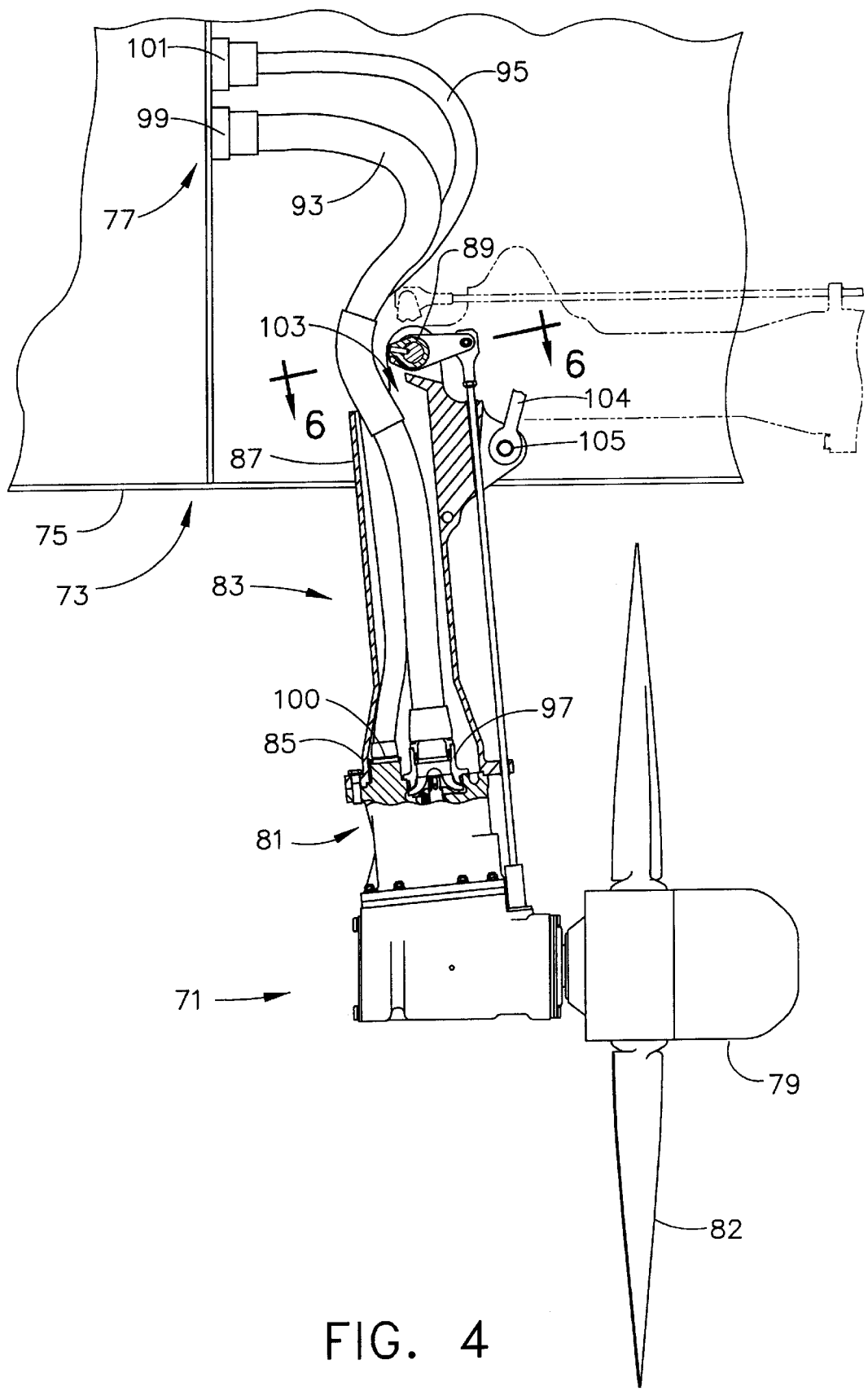
FIG. 4 is a side view of the flexible hoses of the preferred embodiment of the present invention used in conjunction with a strut and attached hydraulic power assembly, with the hydraulic power assembly in its deployed position.

Turning to FIGS. 4 and 5, hydraulic power assembly 71 is a component of aircraft 73. The latter also includes fuselage skin 75 and hydraulic interface 77. Hydraulic interface 77 fluidly communicates with the hydraulic system aircraft 73. Hydraulic power assembly 71 is shown in its deployed position. The stowed position of hydraulic power assembly 71 within fuselage skin 75 is shown in phantom in FIG. 4.

Hydraulic power assembly 71 is comprised of ram air turbine 79 and hydraulic pump 81. Hydraulic pump 81 is attached to and powered by ram air turbine 79. Ram air turbine 79 includes blades 82. Strut 83 includes distal end 85 and proximal end 87. Hydraulic power assembly 71 is attached to distal end 85. Proximal end 87 includes spindle 89. Aircraft 73 includes a trunion (not shown) located within fuselage skin 75. Spindle 89 is mounted on the trunion to provide strut 83 and hydraulic power assembly 71 a rotational degree of freedom about axis of rotation 91.

Supply hose 93 and return hose 95 are flexible hoses capable of communicating hydraulic fluid. One end of supply hose 93 is sealably connected to supply port 97 of pump 81, while its other end is sealably connected to supply port 99 of hydraulic interface 77. One end of return hose 95 is sealably connected to return port 100 of pump 81, while its other end is sealably connected to return port 101 of hydraulic interface 77. Supply hose 93 thus communicates supply hydraulic fluid from hydraulic interface 77 to pump 81, and return hose 95 communicates return pressure fluid from pump 81 to hydraulic interface 77.

Supply hose 93 and return hose 95 are enclosed within strut 83 from their respective connections to pump 81 until they exit through opening 103 in proximal end 87 of strut 83. Opening 103 is best shown in FIG. 6, which is a top section view of proximal end 87 of strut 83, taken along line 6—6 of FIG. 4.

An actuator (not shown) inside fuselage skin 75 includes attachment rod 104, which is rotatably attached to strut 83 at annular opening 105. The actuator rotates strut 83 about axis of rotation 91 and, in so doing, can either deploy hydraulic power assembly 71 from its stored position for use during an emergency; or rotate hydraulic power assembly 71 into its stored position.

When hydraulic power assembly 71 is rotatably deployed into an airstream, ram air turbine 79 powers pump 81. Pump 81 is then able to supply return hydraulic fluid to the hydraulic system of aircraft 73.

It should be understood, of course, that the foregoing relates to preferred embodiments of the invention and that modifications may be made without departing from the spirit and scope of the invention as set forth in the following claims.

We claim:

1. An apparatus for fluid communication comprising:
   a power means for producing a return hydraulic fluid;
   a device operable by the return hydraulic fluid;
   a strut;
   said power means being flexibly attached to said strut;
   said strut having a range of motion relative to the device, whereby
   motion and positioning of said power means relative to the device is obtained by motion of said strut relative to the device; and
   a flexible hose at least a portion of which lies within said strut, said hose fluidly communicating said power means and the device.

2. The fluid communication apparatus as set forth in claim 1 wherein:
   said strut rotates about an axis of rotation, whereby
   motion of said power means relative to the device is along an arc.

3. The fluid communication apparatus as set forth in claim 2 wherein said power means is for deriving power from an airstream.

4. The fluid communication apparatus as set forth in claim 3 further comprising:
   a vehicle;
   the vehicle containing the device and a storage space for storing said power means; and
   the storage space being for preventing said power means from deriving power from the airstream when said power means is situated in the storage space, whereby
   said power means does not produce return hydraulic fluid when situated in the storage space.

5. The fluid communication apparatus as set forth in claim 3 further comprising:
   a storage position preventing the airstream from impinging on said power means;
   a deployed position different from the storage position, whereby
   said power means is operable only when said power means is in the deployed position; and
   actuator means for rotating said power means between said storage position and said deployed position.

6. The fluid communication apparatus as set forth in claim 4 wherein:
   said power means is comprised of a pump means and a turbine means, with said pump means being connected to and powered by said turbine means;
   a hydraulic interface located in the vehicle;
   the hydraulic interface fluidly communicating with the device;
   said hose being sealably connectable to the hydraulic interface.

7. The fluid communication apparatus as set forth in claim 6 further comprising:
   actuator means for rotating said strut and situating said power means outside of the storage space, wherein
   said hose is comprised of a supply hose and a return hose;
   said supply hose being for communicating supply hydraulic fluid;
   said return hose being for communicating return hydraulic fluid.

8. The fluid communication apparatus as set forth in claim 7 wherein:
   the vehicle includes a trunnion;
   said strut includes a spindle;
   the spindle is mounted on the trunnion; and
   said axis of rotation passes through the spindle.

9. The fluid communication apparatus as set forth in claim 8 wherein:
   said pump means is a hydraulic pump;
   said turbine means is a ram air turbine;
   said hose has a length; and
   a portion of said length lies within said strut.

10. An apparatus for fluid communication comprising:
    power means for generating hydraulic power from an airstream;
    a deployed position for exposing said power means to the airstream, whereby
    said power means generates power;
    a storage position for shielding said power means from the airstream, whereby
    said power means is idle;
    actuator means for moving said power means between the deployed position and the storage position;
    flexible hoses for communicating hydraulic fluid between said power means and a device operable by said power means; and
    an elongated strut through which said flexible hoses are channeled.

11. The fluid communication means as set forth in claim 10 further comprising:
    said power means being attached to said strut;
    said strut being rotatably attached to a vehicle;
    the device being located on the vehicle; and
    the actuator means being rotatably attached to said strut, whereby
    said power means moves along an arc upon being moved by the actuator means.

12. The fluid communication means as set forth in claim 11 further comprising:
    a turbine means for generating power from the airstream;
    a pump means for providing a return hydraulic fluid;
    said power means being comprised of said turbine means powering said pump means;

said elongated strut having a proximal end and a distal end;

said power means being attached to said distal end; and said proximal end being rotatably attached to the vehicle.

13. The fluid communication means as set forth in claim 12 wherein:

said turbine means is a ram air turbine;

the vehicle is an aircraft; and the device is a hydraulic system for the aircraft.

14. An apparatus for fluid communication comprising:

power means for generating power;

at least one flexible hose for communicating fluid between said power means and a device capable of being powered by said power means;

a coordinate system having an origin;

the device being in a fixed location in the coordinate system and said power means being located on a radius rotatable about the origin; and said radius being a strut for channeling said at least one flexible hose.

15. The fluid communication apparatus as set forth in claim 14 further comprising:

an axis of rotation intersecting the origin;

a plane containing the origin and lying normal to the axis of rotation; and the radius lying in the plane.

16. The fluid communication apparatus as set forth in claim 15 wherein:

the radius has a proximal end and a distal end;

the proximal end includes the origin; and said power means is affixed to the distal end.

17. The fluid communication apparatus as set forth in claim 16 wherein:

said power means is for generating power from an airstream;

said power means being capable of being subjected to the airstream in a deployed position, whereby said power means generates power in the deployed position;

a storage position for said power means;

said power means not being exposed to the airstream in the storage position; and actuator means for rotating said power means between the stored position and the deployed position.

18. The fluid communication apparatus as set forth in claim 17 wherein:

said strut is an elongated strut;

said flexible hose has a length; and the strut encloses a portion of said length.

19. The fluid communication apparatus as set forth in claim 18 wherein said power means is comprised of a hydraulic pump powered by a ram air turbine.

* * * * *